United States Patent [19]

Olsen et al.

[11] E Re. 31,453

[45] Reissued Dec. 6, 1983

[54] LAUNDRY FEEDING APPARATUS

[75] Inventors: Niels J. Olsen, Bornholm, Denmark; Henry J. Weir, Dublin, Ireland

[73] Assignee: Beta S/A, Luxembourg, Luxembourg

[21] Appl. No.: 78,971

[22] Filed: Sep. 25, 1979

Related U.S. Patent Documents

Reissue of:

[64] Patent No.: 4,050,173
Issued: Sep. 27, 1977
Appl. No.: 610,373
Filed: Sep. 4, 1975

[30] Foreign Application Priority Data

Sep. 4, 1974 [DK] Denmark ..... 4673/74

[51] Int. Cl.[3] ..... D06F 67/04
[52] U.S. Cl. ..... 38/143
[58] Field of Search ..... 38/143

[56] References Cited

U.S. PATENT DOCUMENTS

| | | | |
|---|---|---|---|
| 3,421,756 | 1/1969 | Weir | 38/143 |
| 3,604,132 | 9/1971 | Frisby et al. | 38/143 |
| 3,657,832 | 4/1972 | Valentine | 38/143 |
| 3,667,143 | 6/1972 | Hall | 38/143 |
| 3,791,057 | 2/1974 | Hall | 38/143 |
| 4,106,227 | 8/1978 | Allen et al. | 38/143 |
| 4,143,476 | 3/1979 | Holmes et al. | 38/143 |

*Primary Examiner*—Louis Rimrodt
*Attorney, Agent, or Firm*—Wallenstein, Wagner, Hattis, Strampel & Aubel

[57] ABSTRACT

A loading station located at one side of a feeding conveyor, into which the corners of a sheet can be loaded. The station comprises two movable clamping devices supported on a track which runs across the rear of the feeding conveyor. Each clamping device is driven by an independent transmission system, the two transmission systems are connected to a selfcentering interlock mechanism. The centering mechanism is arranged to permit independent movement of the two clamping mechanisms, whereby they can move from the side position into a position in front of the feeding conveyor. The centering mechanism will then automatically control the tensioning and positioning of the leading edge of the sheet which is held by the clamping devices irrespective of the width of the sheet.

This will result in the center of the sheet being positioned in line with the required feeding center of the feed conveyor.

25 Claims, 3 Drawing Figures

LAUNDRY FEEDING APPARATUS

Figure 1:
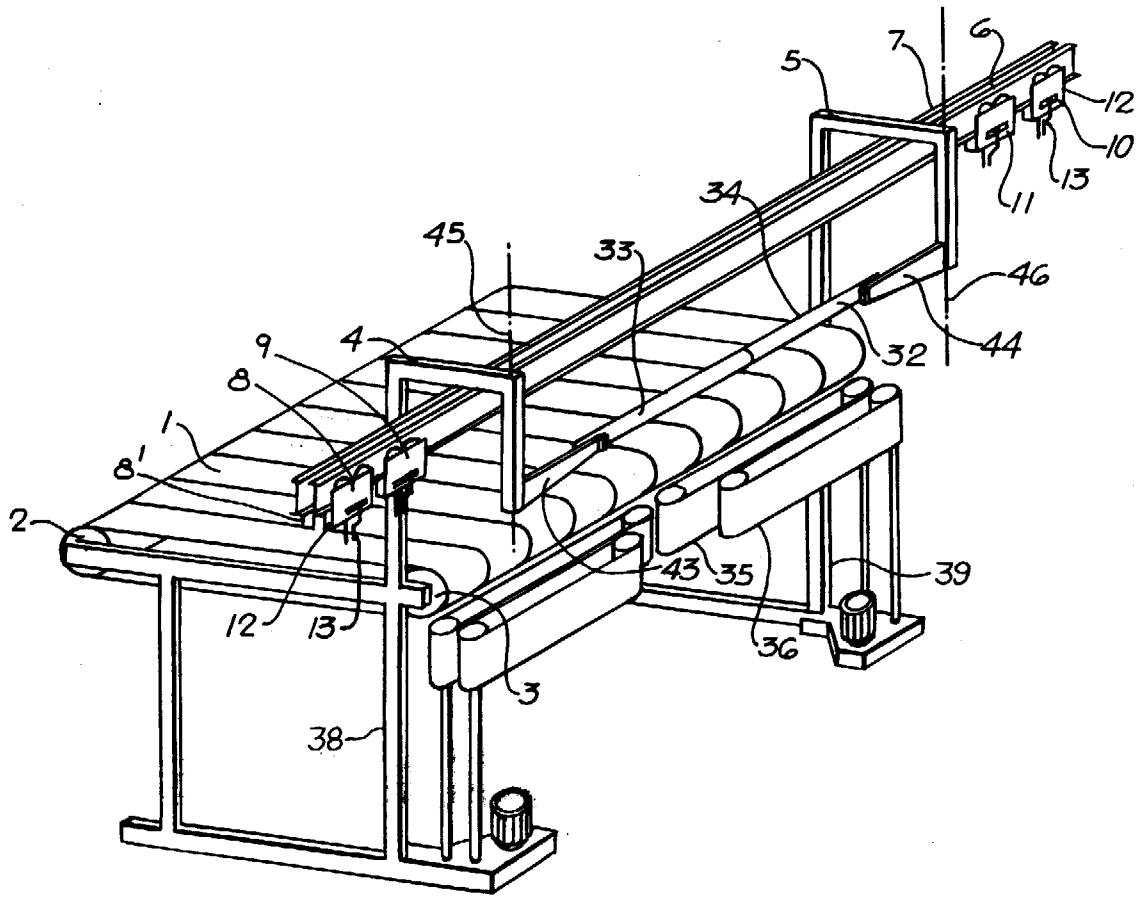

Matter enclosed in heavy brackets [ ] appears in the original patent but forms no part of this reissue specification; matter printed in italics indicates the additions made by reissue.

The invention relates to an apparatus for spreading and feeding pieces of laundry, such as sheets, on a conveyor. More particularly, the apparatus comprises a number of paired clamping devices, which feed and spread the pieces of laundry between the front end of a belt conveyor and the apparatus further comprise a substantially horizontally movable blade. Following release of the clamping devices each of which is holding a corner of the piece of laundry, the movable blade transfers the laundry to the belt conveyor.

A known apparatus comprises three pairs of clamping devices, which are positioned at each of three loading stations. The laundry is transferred by the clamping devices to a pair of gripper fingers at spreading section. The gripper fingers initially move apart in front of a belt conveyor, spreading the sheet of laundry to its full width. Then the gripper fingers move in the feeding direction of the conveyor and over its front end and release the sheet. The sheet is transported by the conveyor to for example an ironer.

This known apparatus has drawbacks. It is complicated in construction, and it performs a number of operations, of which some must be synchronized and others have to be coordinated in order to evenly distribute the load on the three feeding stations. Because of the complexity of its functions, this known apparatus is not able to fully use the capacity of modern ironing machines.

Modern ironing machines often have an operational speed of more than 1 m/sec. Such speed corresponds to a theoretical output of 1300–1800 pieces of laundry per hour, depending on the length of each piece. A trained team of 4 or 5 operators is able to manually feed up to 1000 pieces of laundry per hour, with the normal production being 800–900 pieces per hour.

The operational speeds of known apparatus for spreading and feeding laundry vary depending on the type and design of the apparatus. The best results until now, however, has been a speed of approximately 1000 pieces per hour. The advantage gained until now through automation of the laundry feeding process, therefore, is a reduction in the number of operators involved in feeding laundry and a reduction in the requirements as to their training and skill. Another advantage is that the pieces of laundry can be exactly centered, facilitating automation of a subsequent folding process.

In the known laundry feeder referred to above the manual work is distributed evenly between 2 or 3 operators, who have to insert 500 or 333 pieces of laundry per hour respectively in the clamping devices. In the known apparatus the speed of laundry insertion is limited by the conditions under which the operators have to work. As the laundry normally is placed behind the apparatus, the operators have to turn their bodies in order to insert the corners of each sheet in the clamping devices of each station. This turning requires ample space if the operators are not to disturb each other.

The object of the present invention is to provide an apparatus for spreading and feeding pieces of laundry on a conveyor at a speed which substantially corresponds to the capacity of a modern ironer, and which spreading apparatus is to be operated by up to four operators working at four stations arranged in such a way that the work areas of the operators do not interfere.

A further object of the invention is to provide a drive mechanism for the clamping devices of the laundry feeding apparatus, which clamping devices have small moments of inertia and are also able to position laundry at the required feeding center of the feeding conveyor.

A further object of the invention is to provide a blade mechanism that performs a smoothing action on the leading edge of each piece of laundry which is being released simultaneously with the activation of the blade.

The apparatus of the invention spreads and feeds pieces of laundry such as sheets, onto a conveyor. The apparatus comprises a number of paired clamping devices, which feed the pieces of laundry from a loading station and spreads them in a position between the front end of a belt conveyor and a substantially horizontally movable blade. The clamping devices each hold a corner of the piece of laundry. Upon release of the clamping devices from a piece of laundry, the movable blade transfers the piece of laundry to the belt conveyor. Each clamping device is driven by an independent transmission system. The two transmission systems in each pair of clamping devices are connected to a selfcentering interlock wherein further activation of the transmission system will move the clamping devices apart, spreading the leading edge of the piece of laundry before it is transferred to the conveyor.

In one embodiment of the invention each independent transmission comprises cable loops threaded over a series pulleys. One pair of groups of pulleys are mounted in a fixed position. Another pair of groups of pulleys are mounted on a sliding bar. Each sliding bar is driven by a pneumatic cylinder. One of the cable loops in a pair of clamping divide has a crossing for driving the clamping means in the same direction when the sliding bars are driven towards each other.

In another embodiment of the invention the transmission systems are arranged on two straight and parallel tracks running across and in front of the conveyor. Each track supports two pairs of clamping devices with the loading stations for the clamping devices being at the ends of the tracks. The loading stations of the two tracks are arranged face to face.

Preferably the blade comprises two blade parts each supported by a pivotable arm. The arms are arranged to move the blade parts in an arcuate outwardly directed movement over the conveyor.

Further objects and features of the invention will be apparent from the detailed description disclosing an embodiment of an apparatus according to the invention.

In the drawings

Figure 2:
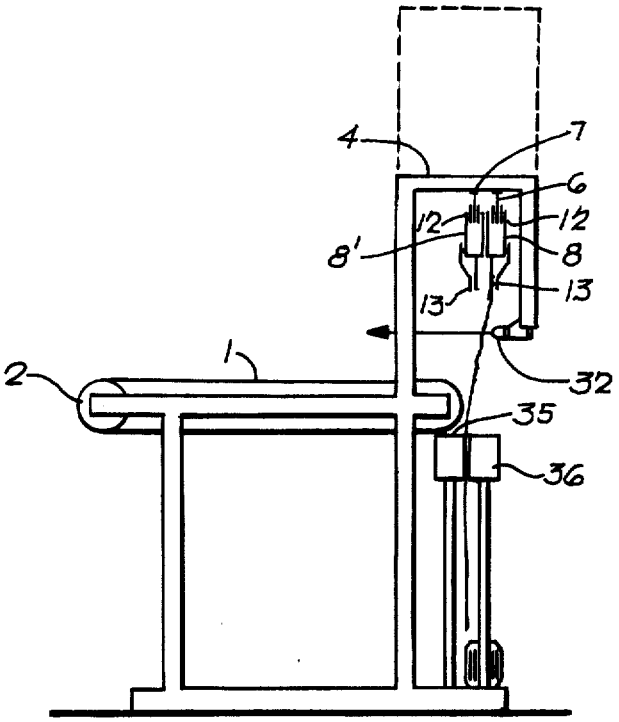
Figure 3:
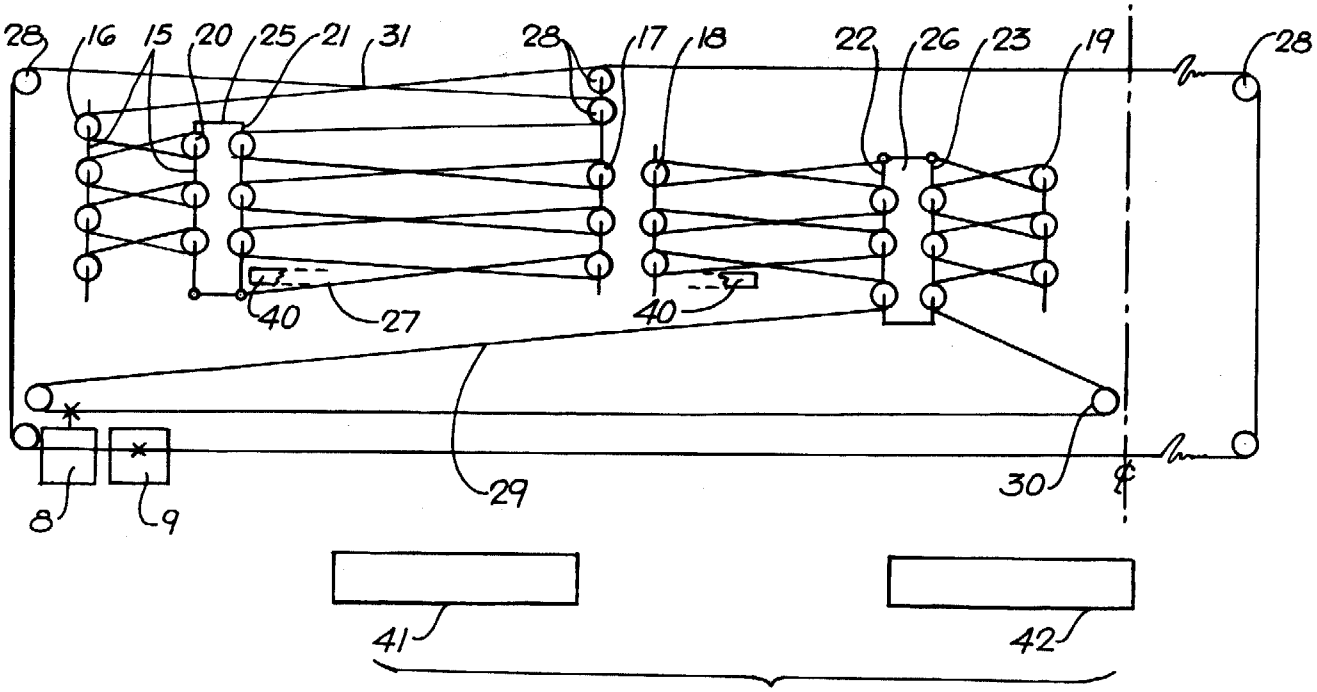

FIG. 1 shows an embodiment of the feeding and spreading apparatus in a perspective view, FIG. 2 is a traverse section view along the center line of the embodiment according to FIG. 1 and FIG. 3 shows schematically the cable operating mechanism for each pair of clamping devices.

The apparatus according to FIG. 1 comprises a conveyor 1 with two spaced apart drums 2 and 3, around which a row of parallel belts is driven. The conveyor 1 is placed in front of an ironer (not shown) in such a way that pieces of laundry which have been spread on to the conveyor 1 are fed into the ironer. At the front end of the conveyor 1 two columns 38 and 39 are mounted.

These carry two tracks 6 and 7 which run parallel with and are above the front drum 3 and are in front of the conveyor. The tracks are somewhat longer than the width of the conveyor and protrudes beyond the columns [41, 42] *38, 39* at both sides. On each of the tracks 6 and 7 are movably mounted two pairs of clamping devices 8, 9 and 10, 11, on track 6 and 8', 9' and 10', 11' on track 7. In their non-activated positions the clamping devices rest in pairs at the ends of the tracks. These devices define a total of four loading stations placed pairwise front to front, a pair on each side of the conveyor.

Each clamping device comprises a carriage 12, on which a pair of spring-loaded gripping fingers 13 is mounted. The carriages include means for enabling them to ride along and engage the tracks 6 and 7. The gripping fingers 13 are activated by means of insertion of a corner of an article or a piece of laundry. The article is then held by the fingers until the gripping fingers 13 are separated by means of suitable releasing means, and the the article is released. The separating means are to be described later.

Above the tracks 6, 7 a transmission described below for the carriages 12 is arranged to make two distinct movements. In the first movement the carriages will travel together from the loading station to the centre of the track. Then in a second movement the carriages will move apart in opposite directions until the article suspended in the gripping fingers is spread and tensioned. Preferably, this relative movement of the carriages is such that the article is spread exactly symmetrically with respect to the centre line of the conveyor. The transmission may also be arranged in such a way that the spreading takes place symmetrically around some other point across the conveyor permitting simultaneous spreading of smaller articles side by side on each half of the conveyor.

The transmission may be constructed in several ways. The preferred embodiment is driven pneumatically and its movements are transferred by means of cables which are threaded on a series of narrow, grooved pulleys in such a way that a short movement of a pneumatic piston cylinder combination is transformed into a long fast movement, but with less power. In FIG. 3 the cable arrangement for moving two clamping devices 8 and 9 is shown schematically. Two pneumatic cylinders 41 and 42 are arranged to drive the pair of carriages of the two clamping devices in such a way that each cylinder drives one carriage in a separate transmission system. The arrangement in FIG. 3 shows how two transmission systems are arranged so that the relative movement spreading the article or sheet is always symetrical with respect to a predetermined point on the track, normally the centreline of the apparatus.

The cable arrangement comprises eight groups of pulleys 15, of which four groups of pulleys 16, 17, 18, 19 are mounted in a fixed position, the other four groups 20, 21, 22, 23 being movably mounted. The groups 20 and 21 are mounted on a first sliding bar 25. The groups 22 and 23 are mounted on a second sliding bar 26. Affixed to the first sliding bar 25 there is a loop of cable 27 which is connected to the carriage of the clamping device 9. The loop 27 is threaded through pulleys 15, 16, 17, 21 and around a number of pulleys 28 mounted at fixed positions. The other carriage of the clamping device 8 is connected with a second loop of cable 29. Loop 29 is threaded through pulleys 18,19,22,23 and is guided around pulleys 30 mounted at fixed positions. In the preferred arrangement one of the loops 27 of cable at 31 has a crossing having the effect that a movement of the two sliding bars 25,26 in opposite directions will make the two carriages travel along the track in the same direction. Extending between the two sliding bars 25, 26 there is a pushing rod 40 of a length corresponding to the distance between the sliding bars in the predetermined centre position with the carriages close together. The two carriages of the clamping devices 8 and 9 are driven by separate respective pneumatic cylinders 41 and 42.

The functioning of the arrangement is now described. With the two carriages [8,9] close together at a starting position corresponding to the loading station both pneumatic cylinders will be activated simultaneously. The two sliding bars approach each other as the carriages move side by side along the track in front of the conveyor. When the predetermined position, normally the centerline of the conveyor, is reached the sliding bars are in contact through the pushing rod and cannot come closer to each other. Now the cylinder moving the [carriage 9] *carriage associated with the clamping device 9* is deactivated while the other cylinder moving the carriage [8] associated with the clamping device 8 is still activated. The sliding bar 25 pushes the other sliding bar 26 by means of the pushing rod, whereby the two carriages [8,9] *associated with the clamping devices 8,9* will move away from each other. This movement continues until the edge of the piece of laundry by which it is suspended in the clamping devices is fully stretched. This stretched condition is sensed by means of a photo cell which activates the releasing means and activates the pneumatic cylinders to move in the opposite direction, whereby the clamping devices 8,9 return to the starting position in the loading station. The force by which the edge of the piece of laundry is stretched may be controlled, for example, by regulating the air pressure in the pneumatic system.

For each pair of clamping devices a complete transmission mechanism is provided comprising the above described pneumatic cylinders and cables. Therefore, a subsequent laundry spreading cycle with another pair of clamping devices may start its movement towards the centre of the apparatus even before the first pair of devices has returned to its starting position. This makes it possible to start a new cycle 2 to 2.5 seconds after the previous cycle.

When a piece of laundry has been spread out in front of the conveyor 1 it has to be transferred to the conveyor with the edge by which it is suspended as the leading feed edge. This is performed by means of a blade 32, arranged to perform a movement between the track and the top of the conveyor. The arrangement of the blade is seen in FIG. 2 showing a section through the apparatus. Simultaneously with the activation of the blade 32 the releasing means are also activated. The releasing means comprises a rod of the same length as the width of the conveyor. The releasing means is moved in such a way that the clipping fingers are opened against the tension of the springs, the clipping fingers being held open by means of a pawl, which may be released by inserting a piece of laundry between the clipping fingers.

The blade is preferably made in two parts, which simultaneously with the travel over the top run of the conveyor causes a brushing movement outward from the centre line. As shown in FIG. 1 the blade may comprise two telescopic parts 33,34 supported by pivoted arms 43,44 swinging around respective substantially vertical axes 45,46. Each part of the blade may be supported by two pivoted arms, or the blade may comprise telescopic parts as shown.

The blade and the releasing means are preferably driven from a common pneumatic cylinder (not shown) being mechanically interconnected in such a way that the clipping fingers are opened exactly when the blade touches the suspended and spread piece of laundry. The blade then transfers the piece of laundry to the conveyor, at the same time brushing and spreading it on the conveyor. The movement of the blade is quick, as the transfer of the piece of laundry has to be faster than the speed of the conveyor and as the blade has to return out of the way before the next piece of laundry is centered and spread out in front of the conveyor.

In each of the loading stations a contact is placed activating a system of relays and switches which in a predetermined sequence or in form of a queue activates the above described cycle. The operator just inserts two corners of a piece of laundry in the respective clamping devices and when it touches the pawl between the clipping fingers, the spring is released and the piece of laundry is held until the releasing means opens the clipping fingers. Then the piece of laundry is released. When the operator has inserted the two corners he activates the contact. The apparatus then makes a work cycle returning to the starting position ready for insertion of another piece of laundry. The functions of the apparatus are controlled by means of two photo cells, a first one sensing when the upper edge of the article is fully stretched, the second one sensing when the trailing edge is passing a predetermined point and activating the next cycle on the apparatus.

In front of the conveyor 1 two belts 35,36 are arranged. These belts have a spreading action on the pieces of laundry and spread them out in front of the conveyor. The outer sides of the belts are run in the direction towards the centre of the conveyor assisting in centering the articles before the spreading.

In some cases it may be convenient to spread the laundry manually on the conveyor. To overcome this problem the apparatus can have the beam carrying the tracks arranged in such a way that the tracks with the four loading stations are retracted over the feeding conveyor giving access to the front drum of the conveyor.

What is claimed is:

[1. Apparatus for spreading and feeding pieces of laundry, comprising:

a conveyor for receiving laundry from a spreading apparatus; said conveyor having an upstream and a downstream end;

a spreading apparatus comprising at least one pair of clamping devices; each said clamping device including means for holding a piece of laundry; said clamping devices being positioned upstream of said upstream end of said conveyor and above said conveyor; clamping device moving means for moving said clamping devices of said pair thereof apart and together crosswise to the motion of said conveyor and always upstream of said conveyor;

a blade positioned further upstream from said conveyor than said clamping devices and positioned above said conveyor; said blade being movable toward said conveyor to contact the piece of laundry held by said clamping devices and to move the piece of laundry onto said conveyor.]

[2. Apparatus for spreading and feeding laundry of claim 1, wherein said clamping device moving means comprise a separate transmission for each said clamping device; the two said transmissions for said pair of clamping devices move said clamping devices together and apart.]

[3. Apparatus for spreading and feeding laundry of claim 2, wherein each said transmission comprises:] *Apparatus for spreading and feeding pieces of laundry, comprising:*

*a conveyor for receiving laundry from a spreading apparatus;*

*said conveyor having an upstream and a downstream end;*

*a spreading apparatus comprising at least one pair of clamping devices; each said clamping device including means for holding a piece of laundry; said clamping devices being positioned upstream of said upstream end of said conveyor and above said conveyor; clamping device moving means for moving said clamping devices of said pair thereof apart and together crosswise to the motion of said conveyor and always upstream of said conveyor; said clamping device moving means comprising a separate transmission for each said clamping device; the two said transmissions for said pair of clamping devices moving said clamping devices together and apart, each said transmission comprising:* a first group of stationary pulleys; a second group of movable pulleys; a sliding bar; said second group of pulleys being mounted on said sliding bar; each said sliding bar of each said transmission of said pair of clamping devices being [slidable] *movable* toward and away from said sliding bar of said transmission of the other said clamping device of said pair; means for [sliding] *causing* said sliding bars to move toward each other and apart;

each said transmission further comprising a cable loop passing around both said first and said second pulley groups of said transmission and also being attached to the respective said clamping device, whereby said sliding bar and said clamping device [moves] *move* together*; and*

*a blade positioned further upstream from said conveyor than said clamping devices and positioned above said conveyor; said blade being movable toward said conveyor to contact the piece of laundry held by said clamping devices and to move the piece of laundry onto said conveyor* .

4. Apparatus for spreading and feeding laundry of claim 3, wherein said means for sliding said sliding bars comprises:

[a] respective pneumatic [cylinder attached to each said clamping device] *cylinders* for moving the said clamping devices and for causing the respective said sliding bar which is attached to each said clamping device to move toward the other said sliding bar of the other said clamping device of said pair.

5. Apparatus for spreading and feeding laundry of claim 4, wherein one said cable loop of the pair of said transmission cable loops of said pair of clamping devices includes a crossing in the pathway of the one said cable loop for causing motion of both said clamping devices of said pair thereof in the same direction when their said sliding bars are moving toward each other.

6. Apparatus for spreading and feeding laundry of claim [2] *3*, further comprising a plurality of said pairs of clamping devices; each said pair of clamping devices having respective said moving means.

7. Apparatus for spreading and feeding laundry of claim 6, wherein all of said clamping device moving means further comprise two straight parallel tracks extending crosswise of and being positioned above and upstream of said conveyor; each said track supporting at least one said clamping device pair.

8. Apparatus for spreading and feeding laundry of claim 7, wherein each said track has respective opposite end portions; each said track supports two said pairs of clamping devices; each said pair of clamping devices being positioned to start moving from a respective said end portion of its said track.

9. Apparatus for spreading and feeding laundry of claim 7, wherein said blade comprises two separate blade parts extending toward each other; a respective pivot arm supporting each said blade part; a respective upright support for each said pivot arm and each said pivot arm being pivotally supported to pivot about its said upright support; each said blade part being pivotable by its said pivot arm to move through an arc toward and over said conveyor.

10. Apparatus for spreading and feeding laundry of claim [1] *3*, wherein said blade comprises two separate blade parts extending toward each other. A respective pivot arm supporting each said blade part; a respective upright support for each said pivot arm and each said pivot arm being pivotally supported to pivot about its said upright support; each said blade part being pivotable by its said pivot arm to move through an arc toward and over said conveyor.

*11. In a laundry handling system including a conveyor for receiving laundry from an upstream end thereof; the improvement in apparatus for first spreading and then applying a piece of laundry in a spread-out condition upon the upstream end of said conveyor, said apparatus comprising: at least first and second pairs of laundry retaining means for spreading laundry pieces, each pair of such means being mounted on a pair of carriages movable on stationary track means in a path laterally across the upstream end of said conveyor, said pairs of carriages being initially positioned in contiguous relation at respective laterally spaced laundry receiving stations, each of said pair of laundry retaining means being adapted releasably to receive the opposite corner portions of a piece of laundry like a sheet or the like when the retaining devices are contiguous to one another at the associated receiving station; moving means associated with each pair of carriages for moving the carriages on said track means laterally apart to spread the laundry piece opposite and above the upstream end of said conveyor; and pushing means for applying a force to the side of a spread apart piece of laundry facing away from the conveyor when the pair of carriages involved have reached spaced points where the laundry piece is completely spread apart for pushing said spread apart laundry piece upon the upstream end of said conveyor as the pair of retaining means involved release the spread apart laundry piece, said means for pushing said spread apart laundry upon said conveyor being the sole means for initially moving the spread apart laundry piece upon said conveyor; and each of said moving means returning the pair of spaced apart carriages involved to contiguous positions opposite a receiving station when the laundry piece involved is released therefrom.*

*12. The laundry handling system of claim 11 wherein said laundry receiving stations of said first and second pairs of laundry retaining means are spaced substantially on opposite sides of the center point of the upstream end of said conveyor, each of said moving means first moving the associated pair of carriages from its receiving station together to the approximate center point of the upstream end of said conveyor, and the moving one of the carriages past said center point to the opposite side of the conveyor while reversing the direction of movement of the associated carriage, so that the laundry piece is spread apart in a centered position opposite the upstream end of said conveyor, each of said moving means after release of said laundry piece from the associated pair of laundry retaining means returning the associated pair of carriages to the laundry receiving station from which it was originally moved.*

*13. The laundry handling system of claim 12 wherein said laundry receiving stations for said pairs of carriages are located beyond the side margins of said conveyor.*

*14. The laundry handling system of claim 13 wherein there is provided a third and fourth pair of laundry retaining means and associated carriages and moving means like said first and second pair of laundry retaining means and the associated carriages and moving means, the carriages of said third and fourth pair of laundry retaining means being respectively initially positioned in confronting relation to the carriages of said first and second pair of laundry retaining means, to provide four separate laundry receiving stations beyond the side margins of said conveyor.*

*15. The laundry handling system of claim 11, 12, 13 or 14 wherein each of said laundry receiving stations is adapted to have an operator stationed thereat who manually attaches the corner portions of a laundry piece to the pair of laundry retaining means thereat.*

*16. The laundry handling system of claim 11, 12, 13 or 14 wherein said pushing means are a pair of confronting horizontally extending members initially extending parallel to and across the upstream end of said conveyor where the pushing members are also located behind and extend generally parallel to the face of a spread apart piece of laundry facing away from the upstream end of the conveyor, said pair of pushing members being mounted for pivotal movement about pivot axes adjacent the opposite sides of the upstream end of the conveyor so that the pushing members can be pivoted forwardly against the face of said spread apart laundry piece facing away from the upstream end of the conveyor to push the same upon the conveyor.*

*17. The laundry handling system of claim 11, 12, 13 or 14 wherein said moving means associated with each pair of carriages includes a separate transmission for each carriage comprising stationary pulley means, movable pulley means secured to a common member, a flexible motion transmitting means extending between the stationary and movable pulley means of each transmission and secured to the associated carriage so that a given degree of movement imparted to the associated common member will be multipled manyfold at the point where the associated flexible motion transmitting means is connected to the associated carriage, and a selectively operable control device associated with each carriage and associated transmission and having a first condition where the associated carriage is located at the associated laundry receiving station and a second condition where the associated carriage could be moved past and beyond the center of the upstream end of said conveyor, and control means movable by the common member of one of the transmissions for reversing the condition of the control device associated with the other transmission and the direction of movement of the common member associated with the other transmission when the associated carriage has reached the center portion of said upstream end*

*of said conveyor, to effect the immediate reversal of direction of movement of the carriage associated with the other transmission.*

*18. For use with a conveyor for receiving laundry from an upstream end thereof; the improvement in apparatus for first spreading and then applying a piece of laundry in a spread-out condition upon the upstream end of said conveyor, said apparatus comprising: at least first and second pairs of separately movable and feedable laundry retaining devices for spreading laundry pieces and respectively to be moved in paths laterally across the upstream end of said conveyor and being respectively initially positioned at laundry receiving stations spaced laterally on opposite sides of the center point of the upstream end of said conveyor, each pair of laundry retaining devices being adapted releasably to receive the opposite corner portions of a piece of laundry like a sheet or the like when the retaining devices are contiguous to one another at the associated receiving station; and moving means associated with each pair or retaining devices for first moving the associated pair of laundry retaining devices from its receiving station together to the approximate center point of the upstream end of said conveyor, and then continuing without stopping to move one of the laundry retaining devices past said center point to the opposite side of the conveyor while immediately reversing the direction of movement of the associated laundry retaining device, so that the laundry piece is spread apart in a centered position opposite the upstream end of said conveyor; and pushing means for engaging the side of a spread apart piece of laundry facing away from the conveyor when said pairs of retaining devices have reached a point where the laundry piece is completely spread apart for pushing said spread apart laundry piece upon the upstream end of said conveyor as the pair of retaining devices involved release the spread apart laundry piece, said means for pushing said spread apart laundry upon said conveyor being the sole means for initially moving the spread apart laundry piece upon said conveyor; and each moving means returning the spaced apart pair of laundry retaining devices to contiguous positions opposite its original receiving station when the laundry piece involved is released therefrom.*

*19. The laundry handling system of claim 18 combined with said conveyor so that said laundry retaining device moves across the upstream end of said conveyor and wherein the laundry receiving stations for each pair of laundry retaining devices are located beyond the side margins of said conveyor.*

*20. The laundry handling system of claim 19 wherein there is provided two pairs of said laundry retaining devices initially located at separated laundry receiving stations beyond each side of said conveyor and in confronting relationship thereat, and separately and sequentially operable moving means for said pairs of laundry retaining devices like said moving means.*

*21. The laundry handling system of claim 18 wherein said moving means associated with each pair of laundry retaining devices includes a separate transmission for each device comprising stationary pulley means, movable pulley means secured to a common member, flexible motion transmitting means extending between the stationary and movable pulley means of each transmission and secured to the associated laundry retaining device so that a given degree of movement imparted to the associated common member will be multiplied manyfold at the point where the associated flexible motion transmitting means is connected to the associated laundry retaining device, and a selectively operable control device associated with each retaining device and associated transmission and having a first condition where the associated laundry receiving station is located at the associated laundry receiving station and a second condition where the associated laundry retaining device would be moved past and beyond the center of the upstream end of said conveyor, and control means movable by the common member of one of the transmissions for reversing the condition of the control device associated with the other transmission and the direction of movement of the common member associated with the other transmission when the associated retaining device has reached the center portion of said upstream end of said conveyor, to effect the immediate reversal of direction of movement of the retaining device associated with said other transmission.*

*22. The laundry handling system of claim 21 wherein each of said laundry retaining devices is supported on a carriage movable along a stationary track extending along the upstream end of said conveyor.*

*23. The laundry handling system of claim 18 wherein said pushing means are a pair of confronting horizontal members initially extending parallel to and across the upstream end of said conveyor where the pushing members are also located behind and extend generally parallel to the face of a spread apart piece of laundry facing away from the upstream end of the conveyor, said pair of pushing members being mounted for pivotal movement about pivot axes adjacent the opposite sides of the upstream end of the conveyor so that the pushing members can be pivoted forwardly to sweep against the face of said spread apart laundry piece facing away from the upstream end of the conveyor to push the same upon the conveyor.*

*24. For use with a conveyor for receiving laundry from an upstream end thereof, the improvement in apparatus for first spreading and then applying a piece of laundry in a spread-out condition upon the upstream end of said conveyor, said apparatus comprising: at least one pair of laundry retaining devices for spreading laundry pieces and respectively to be moved in a path laterally across the upstream end of said conveyor and being respectively movably positioned at a laundry receiving station spaced laterally from the center point of the upstream end of said conveyor, each pair of laundry retaining devices being adapted releasably to receive the opposite corner portions of a piece of laundry like a sheet or the like when the retaining devices are contiguous to one another at the associated receiving station; and moving means associated with each pair of retaining devices for first moving the associated pair of laundry retaining devices from its receiving station together to the approximate center point of the upstream end of said conveyor, and then continuing without stopping to move one of the laundry retaining devices past said center point to the opposite side of the conveyor while immediately reversing the direction of movement of the associated laundry retaining device, so that the laundry piece is spread apart in a centered position opposite the upstream end of said conveyor, said moving means associated with each pair of laundry retaining devices including a separate transmission for each device comprising stationary pulley means, movable pulley measn secured to a common member, flexible motion transmitting means extending between the stationary and movable pulley means of each transmission and secured to the associated laundry retaining means so that a given degree of movement imparted to the associated common member will be multiplied manyfold at the point where the associated flexible motion transmitting means is connected to the associated laundry retaining device, and a selectively operable control device associated with each retaining device and associated transmission and having a first condition where the associated laundry retaining de-*

*vice is located at the associated laundry receiving station and a second condition where the associated laundry retaining device is moved past and beyond the center of the upstream end of said conveyor, and control means movable by the common member of one of the transmissions for reversing the condition of the control device associated with the other transmission and the direction of movement of the common member of the transmission associated with said other control device when the associated retaining device has reached the center portion of said upstream end of said conveyor, to effect the immediate reversal of direction of movement of the retaining device associated with said other control device.*

*25. In an apparatus having a conveyor for receiving laundry flat pieces, said apparatus including at least first and second pairs of clamps for releasably gripping respective laundry flat pieces at adjacent corners along a top edge thereof, the improvement wherein said first pair of clamps are initially positioned closed to each other at a first loading station near one end of the apparatus at one side of the centerline of the conveyor for the insertion of said corners of a first laundry flat piece into said first pair of clamps by an operator stationed there, and there is provided moving means for moving said first pair of clamps simultaneously from said first loading station laterally in one direction to positions close to each other midway across the apparatus while continuing to grip said adjacent corners of the second laundry flat piece, for thereafter spreading said first pair of clamps apart laterally in opposite directions away from the centerline of the conveyor while said second pair of clamps continue to grip the adjacent corners of a second laundry flat piece, whereby to return one clamp of the first pair toward said first loading station while moving the other clamp of the first pair farther away from said first loading station until the laundry piece is fully spread apart, and thereafter for returning said other clamp of the first pair to said first loading station close to said one clamp of the first pair; said second pair of clamps being initially positioned close to each other at a second loading station near the opposite end of the apparatus at the opposite side of the centerline of the conveyor for the insertion of said corners of the second laundry flat piece into said second pair of clamps by a second operator stationed there, and moving means for moving said second pair of clamps simultaneously from said second loading station laterally in the opposite direction to positions close to each other midway across the apparatus while continuing to grip said adjacent corners of a second laundry flat piece, for thereafter spreading said second pair of clamps apart laterally in opposite directions away from the centerline of the conveyor while said second pair of clamps continue to grip said adjacent corners of the second laundry piece, whereby to return one clamp of said second pair toward said second loading station while moving the other clamp of said second pair farther away from said second loading station until the laundry piece is fully spread apart, and thereafter for returning said other clamp of said second pair to said second loading station close to said one clamp of said second pair.*

*26. An apparatus according to claim 25 wherein each of said moving means include separate flexible means operatively coupled respectively to each clamp to position the same individually; and said flexible means extending transversely across said conveyor and being offset from each other longitudinally of the conveyor.*

*27. An apparatus according to claim 26 wherein each flexible means is operatively coupled individually to a corresponding reversible drive unit to have its operation controlled thereby.*

* * * * *